Figure 1:
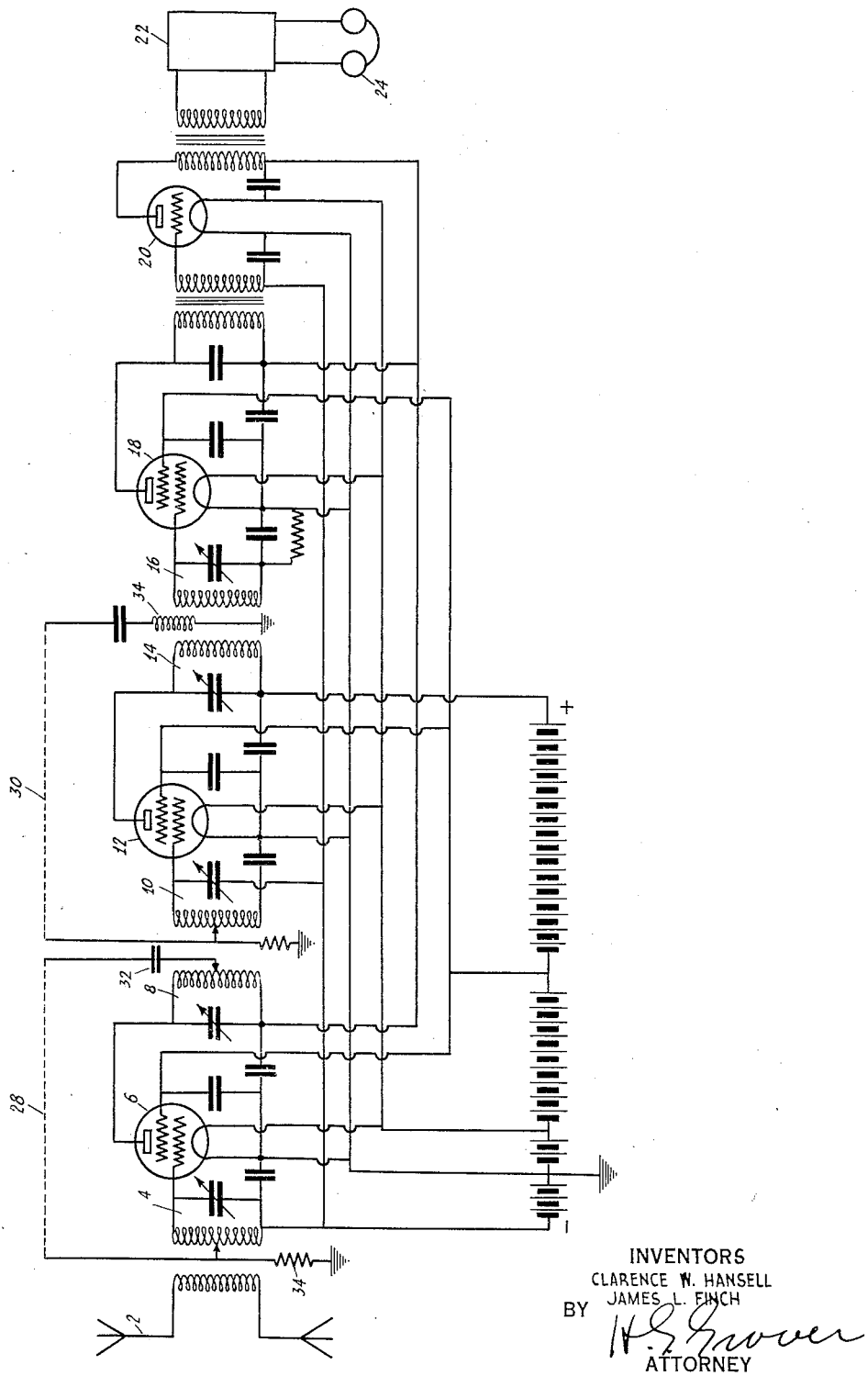

July 23, 1935.  C. W. HANSELL ET AL  2,009,370
FREQUENCY SELECTIVE SYSTEM
Original Filed March 13, 1931  5 Sheets-Sheet 4

INVENTORS
CLARENCE W. HANSELL
JAMES D FINCH
BY
ATTORNEY

Patented July 23, 1935

2,009,370

UNITED STATES PATENT OFFICE 2,009,370

FREQUENCY SELECTIVE SYSTEM

Clarence W. Hansell, Port Jefferson, and James L. Finch, Patchogue, N. Y., assignors to Radio Corporation of America, a corporation of Delaware Application March 13, 1931, Serial No. 522,210
Renewed December 20, 1933

30 Claims. (Cl. 178—44)

This invention relates to electrical apparatus and has for one of its objects the attainment of an increase of frequency selectivity in electrical systems or circuits by the use of transmission lines or conductors which are long relative to a desired working wave length or band of wave lengths.

Transmission lines or conductors, long, relative to a desired wave length of operation, have been used to good advantage for frequency controlling and stabilizing oscillation generators. The lines for such purpose may be aperiodic, in which case traveling potential waves are carried from the output circuit of, say, an electron discharge device oscillator, to the input circuit thereof in correct phase for sustained oscillation generation, the line forming, by suitable shielding of the circuits involved and by suitably preventing the effects of interelectrode capacity of said device, the sole source of feed back.

With a change in frequency, the line produces an augmented phase shift directly proportional to the number of wave lengths contained on the line, as a consequence of which, by making the line sufficiently long, a decided shift in phase for even slight changes in frequency may be obtained resulting in an extremely stable oscillation generator; for, it is by the shift in phase of energy between the input and output circuit that the oscillator can be pulled back to oscillate at a desired frequency. Moreover, as the line will only apply potentials from the output circuit to the input circuit in correct phase for sustained oscillation generation at a frequency corresponding to that for which the line is a predetermined whole number of half wave lengths long, oscillation generation at other frequencies does not occur.

This aperiodic long line frequency control system is described more fully in United States Patent No. 1,945,545, granted to James L. Finch and James W. Conklin, February 6, 1934, to which reference is made for a more detailed description.

The transmission lines for frequency control using the phase shift principle resulting from the choice of long line, is not necessarily limited to an aperiodic line for, other types of lines may be used such as a resonant line having standing waves thereon such as disclosed by Clarence W. Hansell in his United States Patent No. 1,945,546, granted February 6, 1934; or, for frequency control and stability, the lines or long conductors may have thereon both standing and traveling waves and such a system is described in the co-pending application of James W. Conklin and James L. Finch, Serial Number 511,210, filed January 26, 1931.

A further object of the present invention is to apply long line frequency control to an electrical system involving a plurality of electron discharge devices whereby the overall frequency selectivity of the system may be enhanced. In an amplifying system, for example, having a plurality of electron discharge devices coupled together by tuned circuits, the system acts as a band pass amplifier usually passing too wide a band of frequencies. In order to sharpen the characteristic curve of such a system, thereby increasing its frequency selectivity, according to the present invention, long line frequency control is applied to several of the electron discharge devices or the devices and their associated tunable circuits whereby the system may be made as selective to frequency as desired. Such systems, including the long line for frequency control and selectivity, are especially applicable to tuned radio frequency receivers at the short wave lengths where the pass band of the radio frequency amplifiers would otherwise be excessive.

However, if lines of equal length are applied to a plurality of, for example, cascaded amplifiers, for increasing the frequency selectivity thereof, it will be found that in addition to amplifying a maximum amount of energy at or about a mean frequency to which the system is tuned, the system will also amplify to a high degree, certain bands of frequencies lying on both sides of the mean frequencies that it is desired to amplify. In other words, where a single line is applied to a single amplifier, or where lines of equal lengths are applied to a plurality of amplifiers, a plurality of pass bands will exist for the system.

Accordingly, a further object of the present invention is to remedy this defect whereby the amplifying system has only one pass band for a desired predetermined band of frequencies. To accomplish this object, according to the present invention, graded lines or, in other words lines of different electrical lengths, are used in combination with different electron discharge devices of the system, which, as already indicated, may simply be an amplifying system and which may also be, if desired, an oscillation generating system.

The manner in which the use of lines of different lengths will limit the pass band of the system to a single group of frequencies will be described more fully hereinafter.

A further and more specific object of the present invention is to provide a pushpull amplifier or oscillator with graded lines for the purpose of increasing the overall frequency selectivity of the pushpull arrangement of tubes.

Still a further object of the present invention is to apply the frequency selective circuits herein disclosed, to a heterodyne receiving system; as for example to a superheterodyne receiver where the frequency of the intermediate frequency amplifiers is fixed and does not vary with changes in tuning. Therefore, such a system lends itself readily to long line frequency control since the lines can be accurately adjusted as to length and, left in that condition permanently.

To further increase the frequency selectivity and to further improve the action of a heterodyne receiving system, it is a further object of the present invention to provide an oscillation generator whose frequency is controlled by long line means, together with means to provide for ready adjustment in length of the line when it is desired to change the oscillator frequency.

And, in order to eliminate the necessity of a number of independent adjustments in a superheterodyne receiving system, it is a further object of this invention to provide in a superheterodyne system, or, broadly in any electrical system, the combination of a tunable circuit, an electron discharge device having a long line coupled thereto for frequency control and unicontrol means for simultaneously varying the tuning of the circuit and the effective length of the line whereby the frequency of operation of the electron discharge device controlled by the long line is varied simultaneously with the tuning of the circuit.

As the tuning of the circuit is usually varied by equal amounts in frequency with equal movements of an adjusting means, it is a further object of the present invention to provide for variations in length of a long frequency controlling line coupled to an electron discharge device such that for equal movements of the adjusting means for varying the line, equal changes in wave length of operation of the device will ensue.

Still a further object, according to the present invention, is to provide an oscillation generating system comprising a plurality of electron discharge devices to which there are coupled lines or conductors, long, relative to the working wave length for increasing the overall frequency selectivity of the oscillation generating system.

Figure 3:
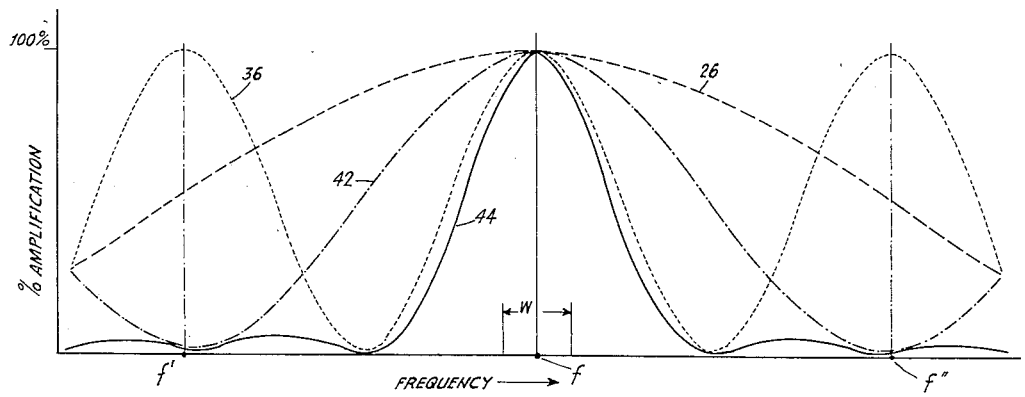
Figure 4:
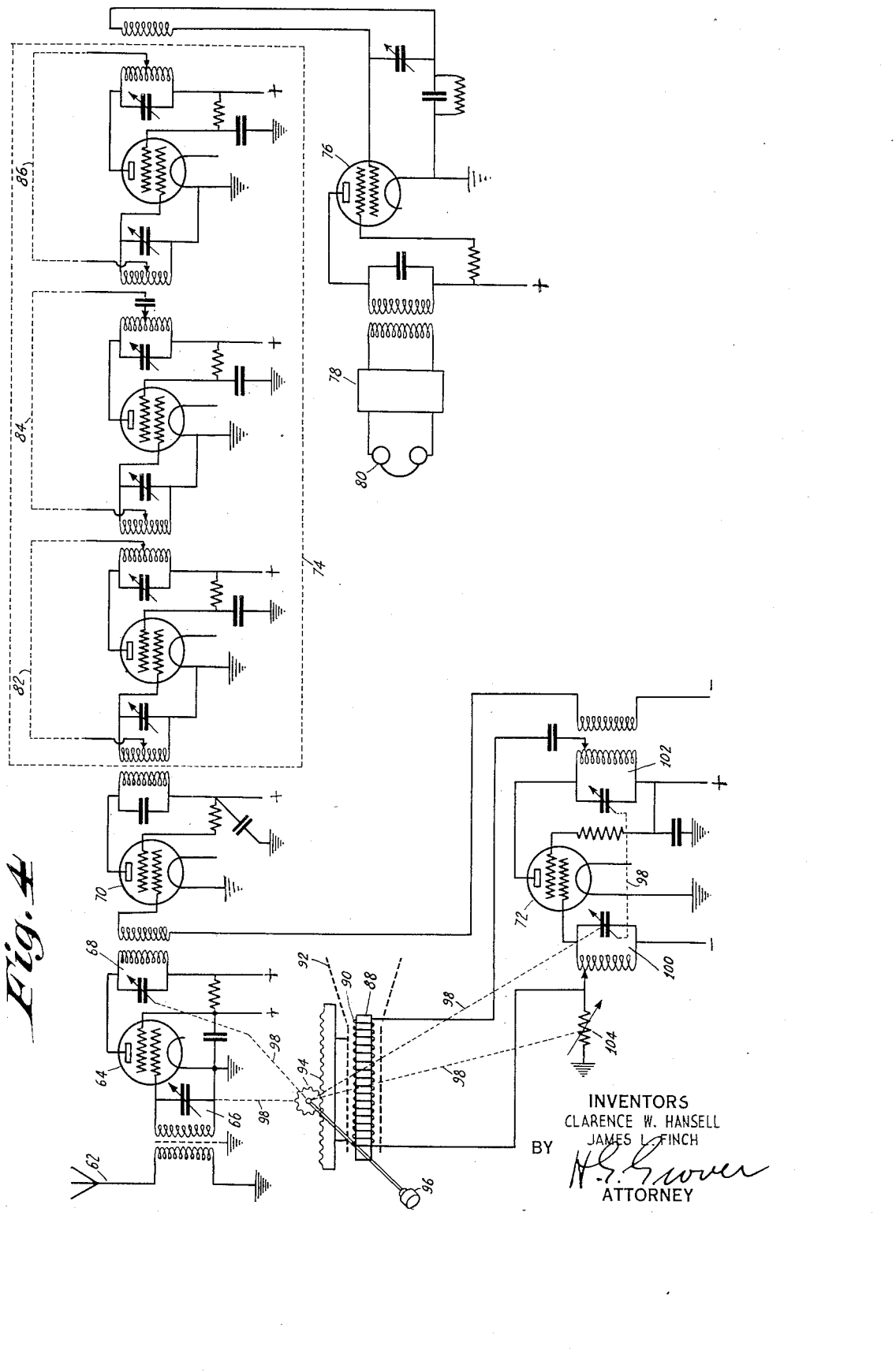
Figure 5:
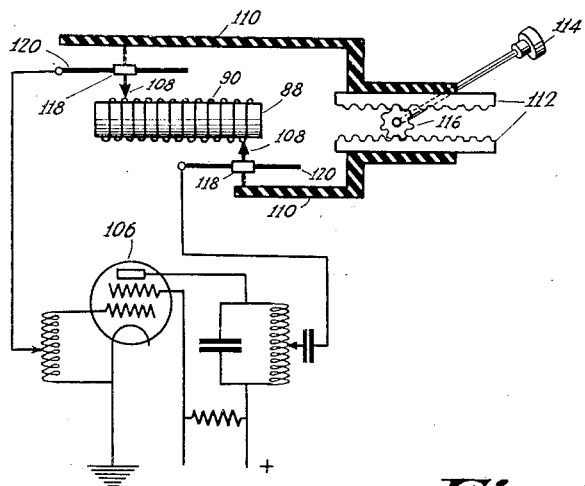
Figure 6:
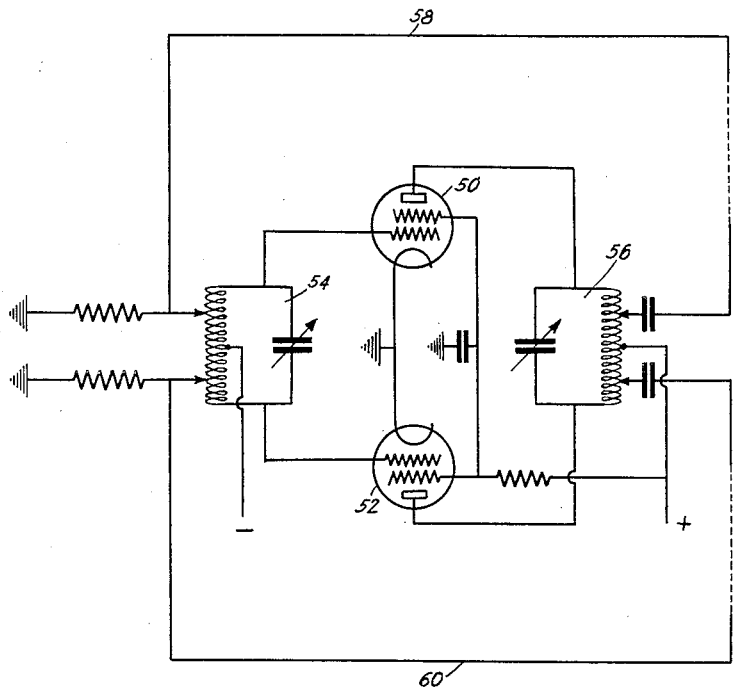
Figure 7:
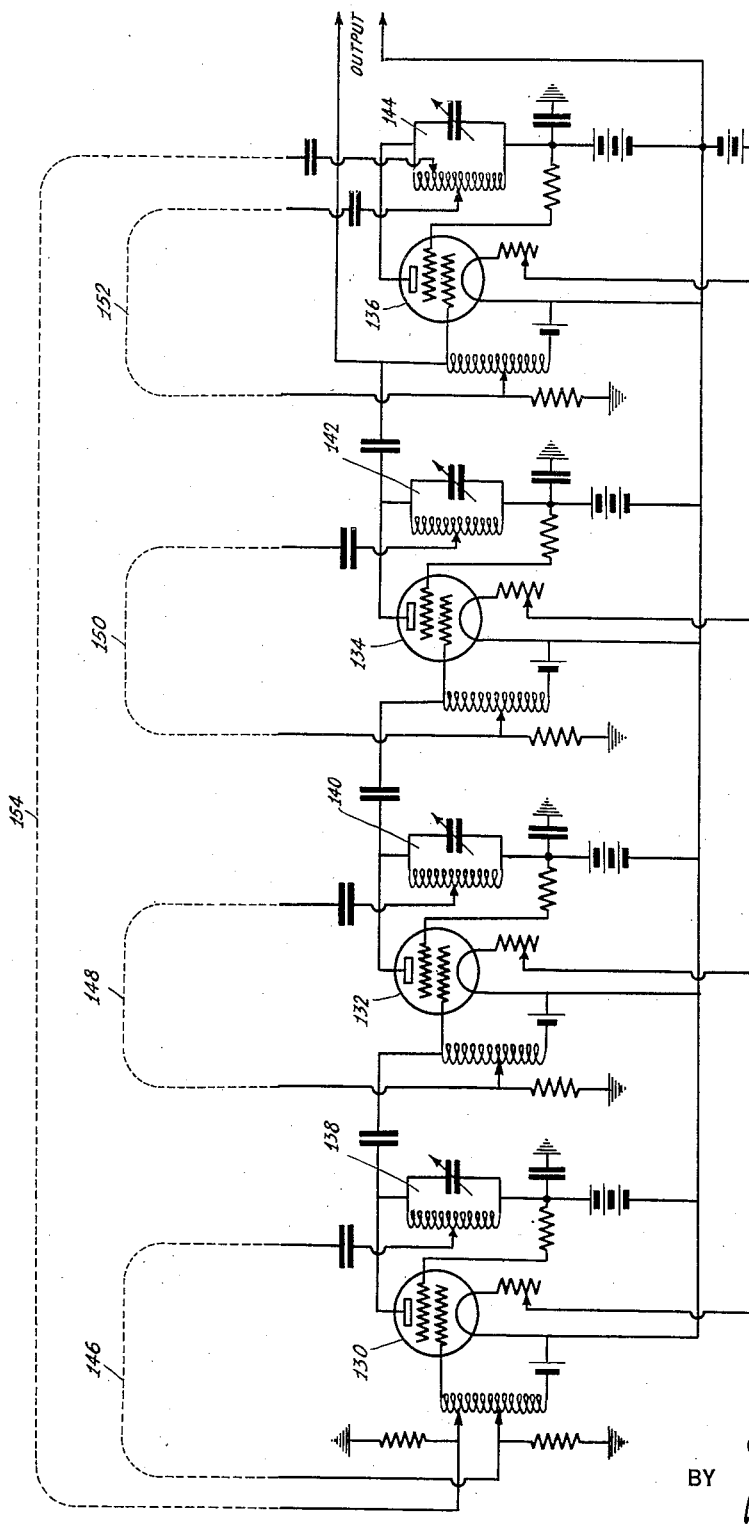

In the appended claims it has been attempted to define the present invention broadly. However, it may best be understood both as to its structural organization and mode of operation by referring to the following description and to the accompanying drawings, wherein Figure 1 is a wiring diagram of a tuned radio frequency receiving system incorporating the present invention, Figures 2 and 3 are curves given in order to explain the present invention, Figure 4 illustrates a superheterodyne radio receiving system wherein graded long lines are used in the intermediate frequency amplifier for increasing the overall selectivity thereof; wherein the local oscillator has long line frequency controlling means; and, wherein line control means are provided for simultaneously adjusting the tuning of the tuned radio frequency amplifier and local oscillator of the system, Figure 5 illustrates a modification of means for adjusting the length of a particular form of long line used for frequency control, Figure 6 illustrates circuits for applying graded long lines to a pushpull stage or arrangement of electron discharge devices, and, Figure 7 illustrates the application of graded long line frequency control to an oscillation generating system.

Turning to Figure 1, which illustrates a tuned radio frequency receiving system having two stages of radio frequency amplification, high frequency signaling energy collected upon an antenna 2 is fed through tunable circuit 4 to an electron discharge device amplifier 6 in the form of a screen grid tube. Through tunable circuits 8, 10, the former in the output circuit of device 6 and the latter in the input circuit of tube 12, energy is fed to and amplified by screen grid tube 12. The amplified energy is fed through tunable circuits 14, 16 to detector, demodulator or rectifier 18. The output of detector 18 is fed to suitable relatively low frequency amplifiers 20, 22 of any desired number of stages and then translated by a suitable device such as telephones 24.

It is to be clearly understood that any number of tuned radio frequency stages may be used and that screen grid tubes, though not essential since the effects of interelectrode capacity at the higher frequencies may be avoided by the use of suitable neutralization circuits, are preferred in carrying out the present invention.

Figure 2:
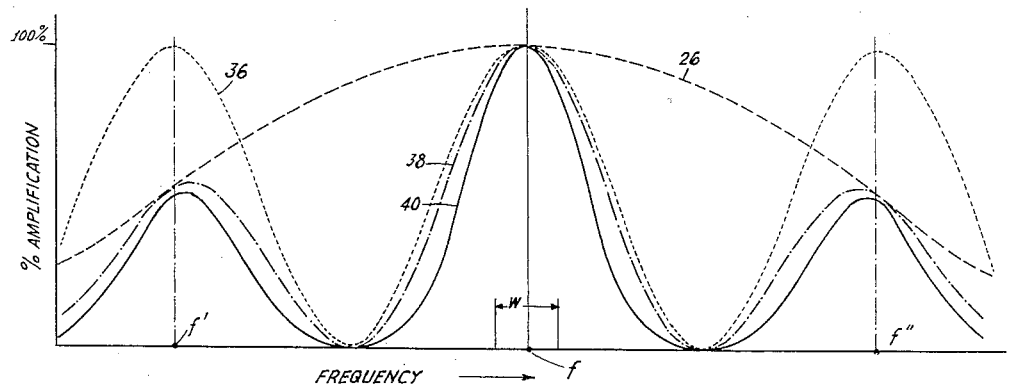

With each of the tunable circuits tuned to a mean frequency $f$ shown in Figure 2, the amplification characteristic of the system would be indicated by curve 26 of Figure 2. As it is desirable at the higher frequencies to amplify only a band of frequencies of width such as $w$ indicated on Figure 2, it is clear that the circuits, as shown, will prove undesirable and oftentimes useless as the band which the circuit amplifies may include the frequencies of a number of adjacent transmitting stations.

To remedy this defect and to limit the band of frequencies passed by the amplifier, according to this invention, means, in the form of conductors or transmission lines 28, 30, long, relative to the wave lengths desired to be passed, are coupled to one or more of the electron discharge devices of the tuned radio frequency amplifying system. As shown, the lines are of the aperiodic type such as disclosed by James L. Finch and James W. Conklin, in their Patent No. 1,945,545, supra, wherein the lines such as line 28 is coupled to the output circuit 8 of electron discharge device 6, through a large blocking condenser 32. The line is terminated at its output end by a surge resistance 34 which has a value equal to the characteristic impedance of the line 28 such that potential variations are unidirectionally fed over the line from the output circuit of the device to the input circuit of the device 6. Blocking condenser 32 is chosen sufficiently large so as to introduce into the line very little reactance to radio frequency currents and at the same time serve to prevent anode potential from being applied to the control electrode of tube 6.

The same result may be accomplished by inductively coupling the line as shown in connection with line 30, by means of inductance coil 34 to the output circuit of tube 12. Moreover, at the output end of the lines or at the input circuits of the devices, the lines may be coupled thereto either inductively, conductively or capacitively, as found desirable, although the arrangement shown in connection with tube 6 is thought preferable. Without tunable circuits, a line such as line 28 coupled to an electron discharge device, would give it an amplifying characteristic such as indicated by curve 36 of Figure 2, the peaks representing frequencies for which the line is substantially a whole number of half wave lengths long. Under this condition, when the line is directly coupled to the output and input electrodes of an electron discharge device and is an odd number of half wave lengths long, regenerative amplification or even sustained oscillation generation will take place depending upon the amount of energy fed back. In connection with the apparatus shown in Figure 1, feed back is limited by suitable adjustment of the taps to the input and output tunable circuits of device 6 so that only regenerative amplification takes place, for it is undesirable in a receiver that oscillation generation occur, for reasons well known to the art.

With a line of correct length on a single stage of the tuned radio frequency amplifier of Figure 1, the overall characteristic of the amplifying system will be improved as to frequency selectivity as shown by curve 38 of Figure 2 and, by the addition of another line of equal length to another stage of the amplifier, the selectivity will be still further improved, indicated by curve 40 of Figure 2, whose sides slope even more steeply about the mean frequency $f$.

However, by virtue of the characteristics of the tuned amplifier system, and the long lines of equal length, it will be clear that other frequencies about the mean frequencies $f'$ and $f''$, will also be emphasized which frequency bands, lying above and below the desired frequency band about and including mean frequency $f$, will prove undesirable and may at times render operation of the system futile.

To overcome this disadvantage, according to the present invention, the lines 28, 30 of Figure 1 are not made of the same length but are graded or made of different electrical lengths. Thus, by making line 30 about one-half the electrical length of line 28, and applying it alone to the tuned radio frequency amplifying system of Figure 1, the overall frequency selectivity, obtained by taking the product of the amplifications permitted by the frequency selectivity of each element in the receiver, would be indicated by a curve such as curve 42 of Figure 3 wherein, as in Figure 1 curves 26 and 36 respectively, indicate the characteristic of the receiver without and with line 28, alone. Now, by adding line 28 to the system in addition to line 30 where line 28 would of itself give the system the characteristic shown by curve 36 of Figure 3, the resultant characteristic of a system having both lines and of different lengths would be similar to curve 44 of Figure 3, indicating maximum amplification of only a small band of frequencies about a desired mean frequency $f$.

It is to be clearly understood, of course, that if a third stage of amplification were used, a line slightly less than twice the length of the longest line illustrated, added to the receiving system shown in Figure 1 would result in a single pass band characteristic for the tuned radio frequency amplifier much narrower than that illustrated by curve 44 of Figure 3. If extreme selectivity is desired, this process of adding stages of amplification with increasing lengths of line may be increased indefinitely.

In other words, by suitable choice of line lengths, minimum regeneration or maximum degeneration at frequencies either side of a desired frequency at which another line gives maximum regeneration, may be obtained and in this manner the overall result becomes a single pass band much narrower than would be obtained if ordinary tuned circuits were relied upon, or, if simply equal length lines were applied to all stages of the amplifier.

Application of the present invention to a pushpull stage either of amlification or oscillation generation, is illustrated in Figure 6 wherein electron discharge devices 50, 52 of the screen grid type are coupled together in pushpull fashion by tunable input and output circuits 54, 56. Lines 58, 60 of different electrical lengths, are used to supply feed back, suitable adjustments of the tapping points to the tunable circuits controlling the amount of regeneration so that amplification or sustained oscillation generation at a particular narrow band of frequencies ensues as desired. Of course, it is to be clearly understood that a number of stages such as shown in Figure 6 may be cascaded and the lines of each stage appropriately graded so as to give the desired frequency selectivity characteristic.

The manner in which the present invention may be applied to a heterodyne receiving system is illustrated in Figure 4. Energy collected upon an antenna 62 is amplified by a radio frequency amplifier 64, of any number of stages, having associated therewith tunable circuits 66, 68. The amplified radio frequency energy is fed to a mixing tube or first detector 70 together with energy from a local oscillator 72, to be described more in detail hereinafter.

Output energy from the mixing tube or detector 70 is fed to a multi-stage intermediate frequency amplifier 74 having long line means for controlling the overall frequency selectivity thereof. The amplified intermediate frequency energy from the intermediate frequency amplifier is fed to a second detector 76 and thence to an amplifier 78, of any suitable number of stages, energizing a suitable translating device 80.

As the intermediate frequency amplifier 74 customarily operates at a fixed frequency determined by the difference of frequencies between the tuning of the radio frequency amplifier and the local oscillator 72, long lines 82, 84, 86, of carefully adjusted length may be applied to each or any one or more stages of the intermediate frequency amplifier, the long lines not being of equal length but preferably in accordance with what has been said hereinbefore, of unequal lengths to give the intermediate frequency amplifier the predetermined overall frequency selectivity characteristic. For the sake of simplicity, it will be noted that the terminating surge impedances have not been shown.

The local oscillator 72 is preferably, though not necessarily, of the long line frequency control type, the long line in this case being coiled and wound upon a form 88 as described more fully in the United States Patent No. 1,945,545, granted to James L. Finch and James W. Conklin. About the coiled long line 90, here shown also as being of the aperiodic type, there is placed a shield 92 adjustable by means of rack and gear mechanism 94 through manipulation of adjustment member 96. Adjustment of member 96 through the agency of mechanical links such as gears, cords and pulleys, shafts and the like, and diagrammatically indicated by lines 98, causes simultaneous change in the position of shield 92 relative to long line 88 and simultaneous changes in tuning of the tunable circuits 66, 68, associated with the tuned radio frequency amplifier 64 and the tunable circuits 100, 102 associated with the oscillator 72.

There is also uni-control of the surge resistance 104 which may be made in the form of a tunable circuit, variations in tuning giving variations in surge impedance for the line such that despite the tuning of the oscillation generator 72, aperiodic operation will follow, for, the line will always face into a surge impedance at its output end of correct value to prevent reflections thereon.

As the velocity along the coiled line is proportional to the square root of the inductance and capacity of the line per unit length of the line, changes in the effective shielding will, therefore, cause changes in velocity along the line and therefore effect changes in length of the line, making the oscillator oscillate at different frequencies upon rotation of uni-control member 96.

By suitably shaping the shielding 92, which may be determined by trial or mathematically and by the use of suitably shaped condensers in the tunable circuits illustrated, the frequency difference between the oscillator and received signal waves may be maintained constant so that the intermediate frequency amplifier will operate at a predetermined frequency which, in view of the adaptability of long lines to frequency control at higher frequencies, may be made greater than the signaling frequency at all times; or, may be made a frequency equal to the sum of the local oscillator and received frequencies. In this manner, straight line frequency or wave length variation for equal variations or equal incremental changes or adjustments of adjusting member 96 may be obtained for local oscillator 72.

As an added refinement, a similar adjustable long line may be applied to the stages of the tuned radio frequency amplifier 64, for increasing its frequency selectivity, and, if a plurality of stages are used, a plurality of simultaneously adjustable means for varying the lengths of the graded long lines in the tuned radio frequency amplifying system may be used. This feature will simply involve a repetition of the arrangement shown for oscillator 72 and hence need not be described in greater detail.

As an alternative method of producing straight line frequency or wave length variation with equal changes in the adjusting member over the line, the arrangement shown in Figure 5 may be used to good advantage. Here, device 106 may be either an amplifier or an oscillation generator depending upon the amount of energy fed back over the coiled long line 90. The length of line inserted in the circuit may be varied by movement of contacting members 108 attached to insulating bars 110 and in turn supporting racks 112. Movement is imparted to the racks and hence to the contacting members 108 by means of uni-control member 114 moving gear 116 in turn moving racks 112. By means of sliding spring contacts or elements 118, contacting with stationary conductors 120, it will be apparent that predetermined lengths of line may be inserted in the electron discharge device circuit for controlling the frequency of operation of the device 106. A suitable indicating device, may of course, be associated with member 114 to indicate the length of line in circuit and/or the frequency and wave length of operation of device 106.

Winding the coil unidirectionally upon a straight form 88 will obviously produce a straight line variation in wave length for equiangular movements of the adjusting elements 114. However, by suitably spacing the turns of wire or by wrapping the line upon a suitably shaped core, equal variations in adjustment of knob 114 will, of course, give equal variations in frequency of operation of device 106.

An application of the present invention to an oscillating generating system is illustrated in Figure 7. Here, electron discharge devices 130, 132, 134, 136 are cascaded and have in their output circuits suitably tuned circuits 138, 140, 142, and 144. Feed back is established for each device through the medium of long transmission lines 146, 148, 150, 152 which may be adjusted simply for regenerative amplification or for the production of sustained oscillations. It is preferred that lines 146 to 152 be graded as taught, so as to improve the frequency selectivity of the entire system. In addition to the lines already referred to, a line 154 may be provided, coupling the output circuit of the last stage 136 to the input circuit of the first stage 130 to still further increase the frequency selectivity of the system and/or establish feed back for sustained oscillation generation in the event that the other lines are not adjusted for that purpose.

Although the aperiodic type of long line control has been described, it is clear that the other forms of long line frequency control such as already referred to, may be applied with equal advantage to any of the schemes illustrated, for example in connection with Figure 7, the aperiodic long lines may be replaced by a resonant long line system such as disclosed by Clarence W. Hansell in his United States Patent No. 1,945,546, supra, in which case the screen grids of the oscillators may be omitted, and the long line coupled to any sensitive portion of each device or to any one or more of them.

Having thus described our invention, what we claim is:

1. In apparatus for undulatory electrical currents, a frequency selective system comprising a plurality of coupled electron discharge devices, and a transmission line, long relative to the wave length of a desired frequency of electrical currents, coupled to each of a plurality of said devices for increasing the overall frequency selectivity of said system.

2. In apparatus for undulatory electrical currents, a frequency selective system comprising a plurality of coupled electron discharge devices, and a transmission line, long relative to the wave length of a desired frequency of electrical currents, coupled to each of a plurality of said devices for increasing the overall frequency selectivity of said system, at least two of said lines being of different electrical length.

3. In apparatus for undulatory electrical currents, a frequency selective system comprising a plurality of cascaded electron discharge devices, a transmission line, long relative to the wave length of a desired frequency of electrical oscillations, coupled to each of a plurality of said cascaded electron discharge devices for increasing the overall frequency selectivity of said system.

4. In apparatus for undulatory electrical currents, a frequency selective system comprising a plurality of electron discharge devices, tunable circuits for cascading a plurality of said devices, and a conductor, long relative to the wave length corresponding to a desired frequency of electrical oscillations, coupled to each of a plurality of said devices for increasing the overall selectivity of said devices and tunable circuits.

5. In apparatus for undulatory electrical currents, a frequency selective system comprising a plurality of electron discharge devices, tunable circuits for coupling a plurality of said devices, and conductors, long relative to a wave length corresponding to a desired frequency of oscillation of electrical currents, but of different electrical lengths, coupled to a plurality of said devices for increasing the overall selectivity of said devices and tunable circuits.

6. In apparatus for undulatory electrical currents, a plurality of electron discharge devices, tunable circuits for coupling a plurality of said devices, and an aperiodic transmission line, long relative to a wave length corresponding to a frequency of desired electrical oscillation coupling output and input circuits of each of a plurality of electron discharge devices, a plurality of said transmission lines being of different electrical length.

7. In apparatus for undulatory electrical currents, an electron discharge device, a tunable circuit for roughly determining the frequency of operation of said device, a long coiled transmission line for increasing the frequency selectivity of said device coupled to said device, shielding for said transmission line, and, uni-control means for simultaneously varying the tuning of said tunable circuit and the shielding of said line.

8. In apparatus for undulatory electrical currents, a pair of electron discharge devices having their cathodes connected together and their control electrodes connected in phase opposition, and a long transmission line coupled to each of said devices, each of said lines being of different electrical length and operating to increase frequency selectivity at the same desired operating frequency.

9. In apparatus for undulatory electrical currents, a pair of pushpull connected electron discharge devices, and a long transmission line coupled to each of said devices, each of said lines being of different electrical length but adjusted so as to increase frequency selectivity at the same desired frequency of operation.

10. In electrical apparatus for undulatory electrical currents, a pair of pushpull connected electron discharge devices, a tunable circuit associated with said devices for roughly determining the frequency of operation thereof, and a long transmission line coupled to each of said electron discharge devices, each of said lines being of different electrical length but being adjusted to increase frequency selectivity at a desired operating frequency.

11. In apparatus for undulatory electrical currents, a pair of pushpull connected electron discharge devices, a tunable circuit for roughly determining the frequency of operation thereof, a long aperiodic transmission line substantially a whole number of half wave lengths long at a desired frequency of operation coupling input and output electrodes of one of said electron discharge devices, and a long transmission line of different length than said first mentioned transmission line but substantially a whole number of half wave lengths long at a desired frequency of operation coupling input and output electrodes of the other of said pushpull connected electron discharge devices.

12. In apparatus for undulatory electrical currents, a frequency selective system comprising a plurality of electron discharge devices, the output circuit of one device being coupled to the input circuit of the succeeding device and so on, and a transmission line, long relative to the wavelength of a desired frequency of operation, individual to each of said devices, and coupled to two electrodes of its associated device, said lines being adjusted to increase frequency selectivity at the same desired operating frequency.

13. Apparatus as claimed in the preceding claim characterized by the fact that a plurality of said lines are of different electrical length.

14. In apparatus for undulatory electrical currents, a frequency selective system comprising a plurality of electron discharge devices each having an input circuit and an output circuit, the output circuit of said first device being coupled to the input circuit of the second device and so on, a plurality of long transmission lines each coupled individually to one of said electron discharge devices, the long lines being so coupled as to transfer energy from the output circuit to the input circuit of the particular device to which it is coupled.

15. Apparatus as claimed in the preceding claim characterized by the fact that a plurality of said lines are of different electrical length.

16. Apparatus as claimed in claim 14 characterized by the fact that a plurality of said circuits have inductance and capacity and are tuned to substantially a desired operating frequency.

17. Apparatus as claimed in claim 14 characterized by the fact that a plurality of said circuits have inductance and capacity and are tuned to substantially a desired frequency of operation and being further characterized by the fact that said lines are of different electrical length and being further characterized by the fact that the output ends of said lines are terminated by impedances equal in value to the surge impedance of said lines whereby transfer of energy from the output side of one device to the input side of the same device is rendered substantially aperiodic.

18. Apparatus for undulatory electrical currents, comprising a plurality of coupled electron discharge devices, and a transmission line having substantially uniformly distributed inductance and capacity throughout substantially its entire length, coupled to each of a plurality of said devices for increasing the overall frequency selectivity of said system, at least two of said lines being of different electrical length but operating to increase selectivity at the same desired frequency.

19. In apparatus for undulatory electrical currents, a pair of electron discharge devices having their cathodes connected together and their control electrodes connected in phase opposition, and a transmission line having uniformly distributed inductance and capacity coupled to each of said devices, each of said lines being of different electrical length and operating to increase frequency selectivity at a desired operating frequency.

20. In apparatus for undulatory electrical currents, a pair of pushpull connected electron discharge devices, and a transmission line having uniformly distributed inductance and capacity coupled to each of said devices, each of said lines being of different electrical length but being adjusted to increase frequency selectivity at the same operating frequency.

21. In electrical apparatus for undulatory electrical currents, a pair of pushpull connected electron discharge devices, a tunable circuit associated with said devices for roughly determining the frequency of operation thereof and a long transmission line coupled to each of said electron discharge devices, said lines being of different electrical length but adjusted to increase frequency selectivity at the same desired operating frequency.

22. Apparatus for undulatory electrical currents, comprising a plurality of electron discharge devices, the output circuit of one device being coupled to the input circuit of the succeeding device etc., and a transmission line individual to each device, each of said lines having uniformly distributed inductance and capacity throughout substantially its entire length and being coupled to two electrodes of its associated device, said lines being adjusted in length as to increase frequency selectivity at the same desired operating frequency, at least two of said lines being adjusted to different electrical lengths.

23. Apparatus as claimed in the preceding claim characterized by the fact that a plurality of said lines are of different electrical length.

24. Apparatus for undulatory currents comprising a pair of electron discharge devices, a circuit having inductance and capacity coupled to both of said devices and roughly fixing the frequency of operation thereof at approximately a desired frequency of operation, and a circuit having substantially uniformly distributed inductance and capacity coupled individually to said devices and operating to maintain the frequency of operation more closely to a desired frequency of operation.

25. Apparatus as claimed in the preceding claim characterized by the fact that said circuits having uniformly distributed inductance and capacity consisting of conductors of different electrical length.

26. Apparatus for undulatory electrical currents comprising a pair of electron discharge devices, means including a circuit having inductance and capacity and roughly adjusted to a desired operating frequency acting to feed energy from the output side of one of said devices, and a circuit having substantially uniformly distributed inductance and capacity and coupled individually to said devices for increasing frequency selectivity at the same desired frequency of operation.

27. Apparatus as claimed in the preceding claim characterized by the fact that said circuits consisting of conductors having uniformly distributed inductance and capacity but of different electrical lengths.

28. In apparatus for undulatory electrical currents, a pair of electron discharge devices having their cathodes connected together, a circuit exhibiting parallel resonance effects at approximately a desired operating frequency connected between the grids of said devices, another circuit exhibiting parallel resonance effects connected between the anodes of said devices, circuits for subjecting said grids and anodes to suitable operating potentials with respect to said cathodes, conductors having uniformly distributed inductance and capacity coupled to said devices, the conductors coupled to different devices being of different electrical length but operating to increase frequency selectivity at a desired operating frequency.

29. Apparatus for undulatory electrical currents comprising a plurality of electron discharge devices, the output circuit of one device being coupled to the input circuit of the succeeding devices and so on, at least one of said circuits exhibiting parallel resonance effects at approximately a desired operating frequency, and a conductor individual to each of said devices, having uniformly distributed inductance and capacity and being coupled to two electrodes of its associated device, said conductors being adjusted in length as to increase frequency selectivity at the same desired operating frequency, at least a pair of said conductors being adjusted to different electrical lengths.

30. Apparatus as claimed in the preceding claim characterized by the fact that conductors coupled to different devices are of different electrical length.

CLARENCE W. HANSELL.
JAMES L. FINCH.